J. J. BENEDICT.
CIRCUIT CLOSER FOR VEHICLE SIGNALS.
APPLICATION FILED JUNE 14, 1918.
1,317,906.
Patented Oct. 7, 1919.
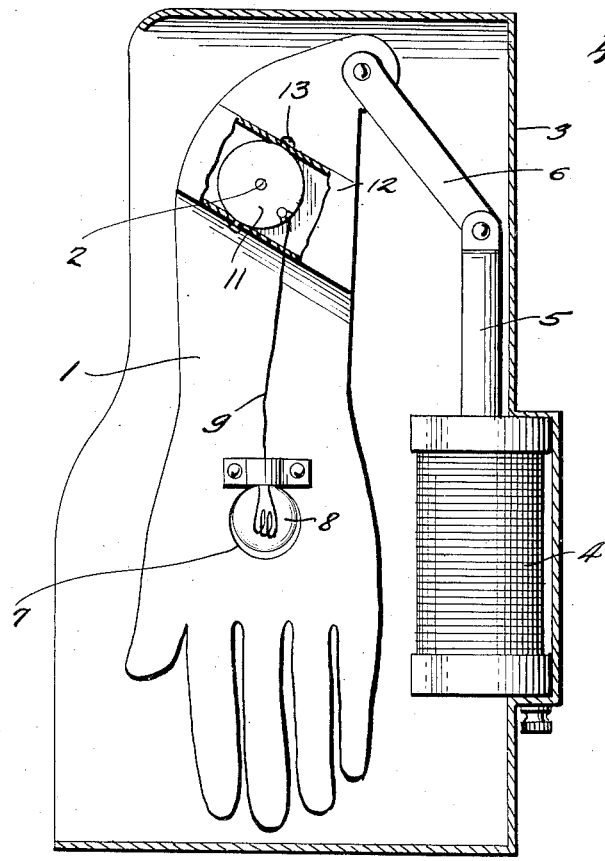
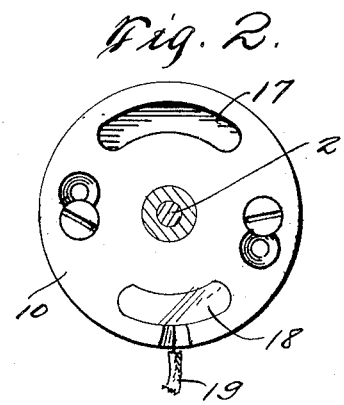
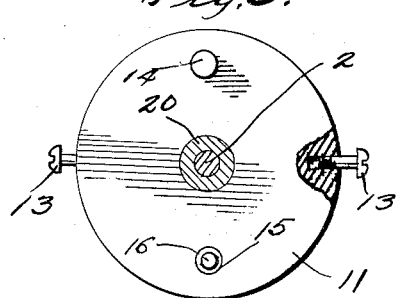
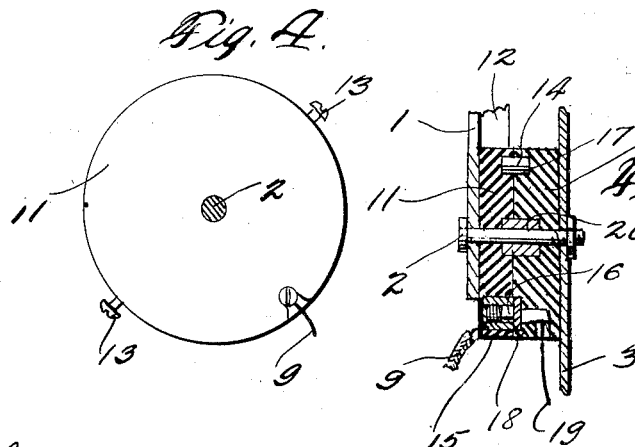
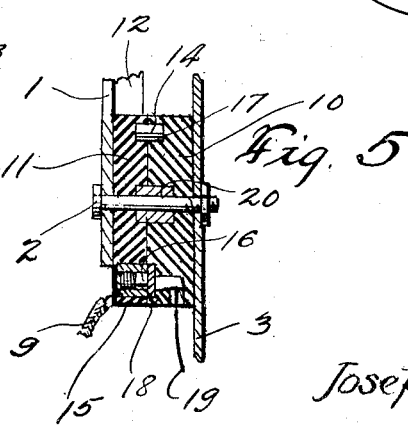
WITNESSES
INVENTOR
Joseph J. Benedict
BY
ATTORNEY

UNITED STATES PATENT OFFICE.

JOSEPH J. BENEDICT, OF CLEVELAND, OHIO.

CIRCUIT-CLOSER FOR VEHICLE-SIGNALS.

1,317,906.  Specification of Letters Patent.  Patented Oct. 7, 1919.

Application filed June 14, 1918. Serial No. 240,067.

*To all whom it may concern:*

Be it known that I, JOSEPH J. BENEDICT, a citizen of the United States, residing at Cleveland, in the county of Cuyahoga and State of Ohio, have invented certain new and useful Improvements in Circuit-Closers for Vehicle-Signals, of which the following is a specification.

This invention has relation to vehicle signaling means, and more particularly to a signal for motor vehicles chiefly of the automobile type, whereby the driver of a vehicle in the rear may be advised of the intention of the driver ahead to make a turn so that collision may be avoided.

The invention has for its object to combine with a signal of the character herein stated, illuminating means whereby the signal may be lighted at night, to insure its being visible to a safe distance.

The invention has for its object to provide novel circuit closing means, whereby when the signal is thrown into danger indicating position the lamp circuit will be closed and the signal illuminated, and whereby when the signal is moved so as to occupy a normal position the lamp circuit is broken thereby preventing the waste of current.

A further purpose of the invention is the provision of circuit closing means which is automatic in operation both in closing and breaking the circuit, such operations being effected automatically when the signal is projected into operative position or withdrawn into inoperative position.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing:

Figure 1, is a detail view of an automobile signal embodying the invention, the casing being in section and a portion of the hand broken away, Fig. 2, is a detail view of a relatively fixed member of the circuit closing means as seen from the inner face, Fig. 3, is a view similar to Fig. 2 of the complemental member of the circuit closing means, Fig. 4, is a view of the member shown in Fig. 3 as seen from the reverse side, and Fig. 5, is a sectional detail.

Corresponding and like parts are referred to in the following description and indicated in the several views of the drawing by like reference characters.

The numeral 1 designates the signaling member which approximates the form of the human hand, the same being pivoted near one end as indicated at 2. The numeral 3 designates a suitable casing for housing the signal and parts associated therewith. The signal is electrically operated, and for this purpose a solenoid 4 is provided, and the core 5 thereof is connected by means of a link 6 with the upper extension of the hand or signaling member 1. When the solenoid 4 is energized by the closing of the circuit in which the same is included, the core 5 is attracted, and the signal 1 is turned into horizontal position, thereby projecting laterally from the vehicle and indicating the intention of the driver to make a turn, thereby warning the driver of a vehicle in the rear, as well as giving warning to pedestrians or others in advance of the vehicle displaying the signal.

The hand or signaling member 1 is provided with an opening 7 in which is located an electric lamp 8, the same being disposed so as to illuminate both sides of the signal, whereby the signal may be seen from in front and in the rear. The lamp 8 is of the bulb type and is included in a circuit represented by the lead 9. When the signal is withdrawn into inoperative position the lamp circuit is broken, but when the signal is extended horizontally into operative position the lamp circuit is closed.

The means for closing the lamp circuit comprises two members 10 and 11, each being preferably of circular form and consisting of vulcanite or other insulating material, the member 10 is secured to the casing 3 and is relatively fixed whereas the member 11 is attached to the hand or signaling member 1 and is therefore relatively movable. As indicated in Figs. 1 and 5 the element 1 has a portion pressed laterally as indicated at 12, thereby forming a channel or recess in which the member 11 is located and secured by fastenings 13, which pass through opposite walls of the part 12 and enter the member 11. A stud 14 projects from the member 11 and is secured to the latter. A metal socket 15 is let into the inner face of the member 11 and receives a spring actuated pin 16, which constitutes one terminal of the lamp circuit.

The member 10 is formed in its inner face with an arcuate recess 17 which receives the projecting end of the pin 14 and its recess 17 is of a length to admit of the hand or signaling member 1 receiving a 90° movement, whereby it may turn from a vertical into a horizontal position and vice versa. A contact plate 18 is set into the inner face of the member 10 so as to come flush therewith and constitutes a terminal of the lamp circuit. This contact plate 18 is disposed so that when the hand or signaling member 1 is in pendent position as indicated in Fig. 1 the spring actuated pin 16 will clear the plate 18 and thereby break the lamp circuit. The contact plate 18 is of such relative length and disposition that upon moving the element 1 from a pendent position into a horizontal position the lamp circuit will be closed after the element 1 has moved a short distance from the vertical and will be maintained until the element 1 reaches the horizontal or extended position and is again returned to a pendent vertical position. Thus when the hand or signal element 1 is in vertical pendent position the lamp circuit is broken, and when moved from the withdrawn position the lamp circuit is closed.

A lead 19 connects with the terminal or contact plate 18.

The part 2 represents a bolt or other fastening about which the hand or signaling member turns, and a sleeve 20 is mounted on the pivot support 2 and extends across the joint formed between the members 10 and 11 of the circuit closing means, thereby holding such parts in axial alinement. It should be stated that the lamp circuit of the signal is included in the lighting circuit of the vehicle, hence is controlled by the main switch of the lighting circuit so that the lamp 8 does not light during the day or only at such times when the main lighting circuit of the vehicle is closed.

Having thus fully described my invention, what I claim as new and desire to secure by Letters Patent is:

In a vehicle signal, including a pivoted member and circuit, circuit closing means coaxial with the pivoted member and comprising relatively fixed and movable elements, the latter being connected to the pivoted member, a sleeve extending across the joint formed between the two elements and mounted in each, a pivot support passing through the sleeve and both elements, stop means between the elements comprising an arcuate recess in the face of one element and a stud projecting into said recess from the face of the other element and circuit closing contacts carried by both elements.

In testimony whereof I affix my signature in presence of two witnesses.

JOSEPH J. BENEDICT.

Witnesses:
 JOE LEHMAN,
 CHAS. GOERTZ.